(12) United States Patent
Neamtu et al.

(10) Patent No.: US 6,957,598 B2
(45) Date of Patent: Oct. 25, 2005

(54) RAZOR BLADE AND METHOD OF MANUFACTURE

(75) Inventors: Nicolae Neamtu, Quincy, MA (US); Stephen F. Hobbs, West Bridgewater, MA (US)

(73) Assignee: The Gillette Company, Boston, MA (US)

( * ) Notice: Subject to any disclaimer, the term of this patent is extended or adjusted under 35 U.S.C. 154(b) by 13 days.

(21) Appl. No.: 10/680,553

(22) Filed: Oct. 7, 2003

(65) Prior Publication Data

US 2004/0221460 A1 Nov. 11, 2004

Related U.S. Application Data

(63) Continuation of application No. 09/618,375, filed on Jul. 18, 2000, now Pat. No. 6,629,475.

(51) Int. Cl.[7] .............................................. B21K 11/00
(52) U.S. Cl. ................ 76/104.1; 30/346.55; 30/346.61
(58) Field of Search ........................ 30/32, 346, 346.5, 30/346.55, 346.61; 76/104.1, 116, DIG. 8

(56) References Cited

U.S. PATENT DOCUMENTS 1,734,554 A * 11/1929 Behrman .................... 74/104.1
2,275,517 A    3/1942  Fay
2,593,307 A    4/1952  Jacobsen
3,600,804 A    8/1971  Brown
5,458,025 A    10/1995 Neamtu
5,661,907 A *  9/1997  Apprille, Jr. .................... 30/47
5,701,788 A    12/1997 Wilson et al. ............. 76/104.1
6,629,475 B1 * 10/2003 Neamtu et al. ............ 76/104.1

FOREIGN PATENT DOCUMENTS

GB           548647      * 10/1942
WO        WO 98/05478      2/1998

* cited by examiner

Primary Examiner—Hwei-Siu Payer
(74) Attorney, Agent, or Firm—Fish & Richardson P.C.

(57) ABSTRACT

An elongated stock material for use in manufacturing shaving razor blades, the material including an elongated, flat strip of metal having a front edge and back edge extending along its length, a sharpened cutting edge portion extending along the front edge, a weakened portion between the front edge and the back edge, a blade portion between the cutting edge portion and the weakened portion, and a removable portion between the weakened portion and the back edge. Also disclosed are blades and cartridges made from the material, and methods and apparatus making and using the material.

10 Claims, 5 Drawing Sheets

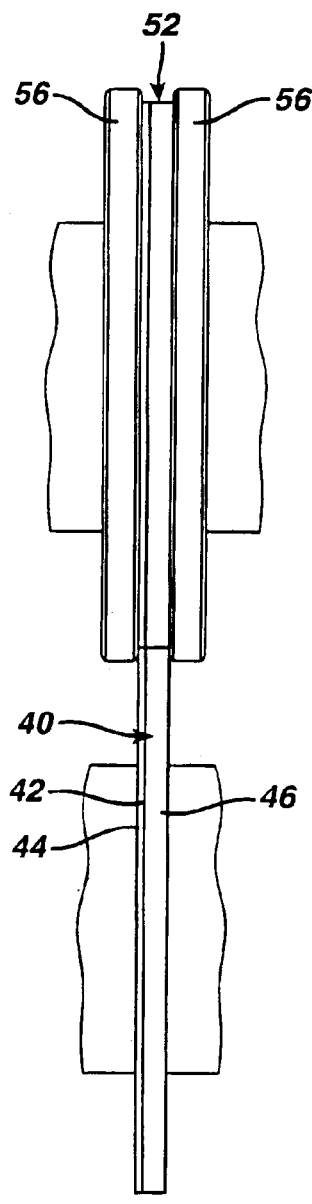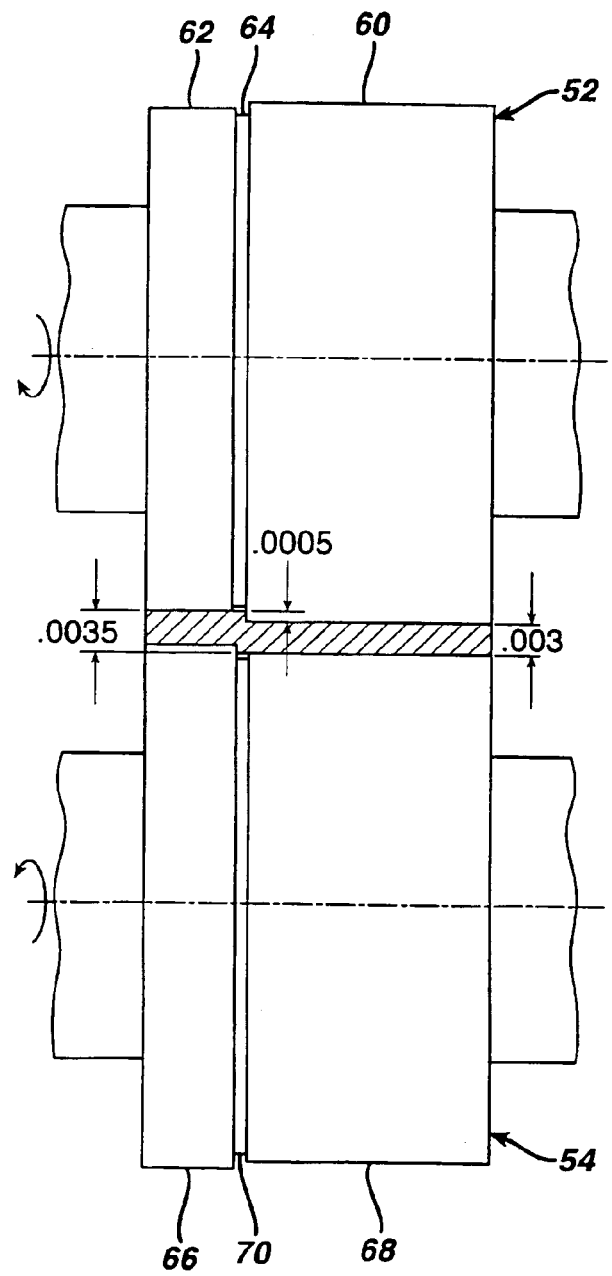

RAZOR BLADE AND METHOD OF MANUFACTURE

This application is a continuation of U.S. patent application Ser. No. 09/618,375 filed on Jul. 18, 2000, now U.S. Pat. No. 6,629,475.

TECHNICAL FIELD

This invention relates to shaving razor blades and stock material, manufacturing methods and apparatus therefor.

BACKGROUND

Razor blades are typically made from a continuous strip of stock material that is hardened and sharpened while the strip travels along a processing line. The strip is then divided in blade length sections used in manufacture of individual cartridges.

In some applications, blades are supported on bent supports that are slidably mounted in the cartridge housing to move up and down during shaving. E.g., FIG. 1 shows cartridge 10 with blades 12 slidably mounted in housing 14, and FIG. 2 shows a blade 12 on a support 16. In these applications, the blades cannot overlap and thus have a small dimension "a" from the cutting edge to the back edge 20. The strip material and blade sections, however, must have a sufficient distance from the front edge to the back edge in order to properly secure and hold the material and sections during processing and attaching to blade supports. It thus is necessary to remove a portion of the blade material after processing and attaching so that the blade will have the desired small dimension from the cutting edge to the back edge. In some applications, the rear section 22, shown in FIG. 3, is removed by bending the rear section 22 between 60° and 90° with respect to the front section 24 after the front section has been attached to the blade support. FIG. 3 also shows spot weld 26, used to attach blade 12 to support 16. There typically is an upturned portion at the rear edge 20 of the attached blade section where the rear section has been removed. In some cases the rear section 22 is not easily removed.

SUMMARY

In one aspect, the invention features, in general, an elongated stock material for use in manufacturing shaving razor blades. The stock material is made of an elongated, flat strip of metal having a front edge and back edge extending along its length. The material has a sharpened cutting edge portion extending along the front edge, a weakened portion between the front edge and the back edge, a blade portion between the cutting edge portion and the weakened portion, and a removable portion between said weakened portion and back edge.

In preferred embodiments, the weakened portion has a reduced thickness compared to the blade portion and the removable portion. The weakened portion has a first notch portion on one side, and a second notch portion on the other side. The notch portions are offset with respect to each other. Each notch portion has a steep surface and a gradually deflecting surface. The weakened portion is located between ¼ and ¾ of the distance from the front edge to the back edge.

In another aspect the invention features, in general, a shaving razor blade including a metal blade having a front cutting edge portion and a back edge, the back edge having a weakened portion from which a removable portion has been removed by bending at the weakened portion.

In preferred embodiments, the blade is mounted on a support member attached to the metal blade. The support member has a base portion that generally extends along a plane that makes an angle between 90 degrees and 135 degrees with a plane extending through the blade. The back edge has a slight bend that is straighter than it would be if the separable portion did not have the weakened portion and has a radius instead of an upturned edge.

In another aspect, the invention features, in general, a shaving razor cartridge including a housing, and one or more blades attached to the housing. Each blade having a front edge having a cutting edge portion and a back edge, the back edge having a weakened portion from which a removable portion has been removed by separating at the weakened portion.

In another aspect, the invention features, in general, a method of making razor blades by providing an elongated, flat strip of metal having a front edge and back edge extending along its length, sharpening the front edge to result in a cutting edge portion extending along the front edge, and weakening a portion of the strip along its length between the front edge and the back edge to result in a weakened portion extending along the strip, a blade portion between the cutting edge portion and the weakened portion, and a removable portion between the weakened portion and the back edge.

In preferred embodiments, the weakening includes forming a crease to provide the weakened portion. The weakening includes deforming a portion of the strip to reduce its thickness to provide the weakened portion. The weakening includes a notch formed on one or both sides of the strip. The strip is deformed by passing the elongated flat strip between two rollers. The deforming includes passing the elongated flat strip between two rollers having different profiles and spaced sufficiently close to each other to cause the portion of the strip to be deformed when passing between them. The strip is cut into discrete blade sections. The blade portions of respective blade sections are attached to respective blade support members. The removable portions are separated from the blade portions by bending at the weakened portions.

In another aspect, the invention features, in general, apparatus for making razor blade material that includes a continuous supply of an elongated, flat strip of metal having a front edge and back edge extending along its length, a processing line along which the flat strip from the supply moves, a sharpening station on the processing line through which the strip passes and at which the front edge is sharpened to result in a cutting edge portion extending along the front edge, and a processing station on the processing line through which the strip passes and at which a portion of the strip between the front edge and the back edge is weakened to result in a weakened portion extending along the strip, a blade portion between the cutting edge portion and the weakened portion, and a removable portion between the weakened portion and the back edge.

In preferred embodiments, the processing station includes two rollers through which the strip passes. The two rollers have different profiles and are spaced sufficiently close to each other to cause the portion of the strip to be deformed when passing between them. Each roller has a large diameter portion and a small diameter portion, the large diameter portion of one the roller being generally aligned with the small diameter portion of the other the roller. Each roller has a thin portion between the small diameter portion and the large diameter portion, the thin portion having a diameter that is less than the diameter of the small diameter portion.

Embodiments of the invention may include one or more of the following advantages. Use of a weakened portion permits one to have a large width to facilitate blade sharpening and attaching to a support, yet also permits a small distance from the cutting edge to the rear edge in the final shaving razor blade product. The use of a weakened portion also permits one to use a softer and higher corrosion resistant material that otherwise would be difficult to separate by bending. The weakened portion permits one to use different types of blade steel and steel provided from various suppliers that normally will not fracture without such weakening. This can permit use of a smaller stock thickness (e.g., 0.002" instead of 0.003", as presently used), which generally is more difficult to fracture. (I.e., thinner stock would be more likely to bend than fracture).

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 7 is a top view showing feeding of the strip material to the FIG. 6 rollers.

FIG. 8 is a diagrammatic elevation of the FIG. 6 rollers shown with the strip material in section.

Like reference symbols in the various drawings indicate like elements.

DETAILED DESCRIPTION

Figure 1:
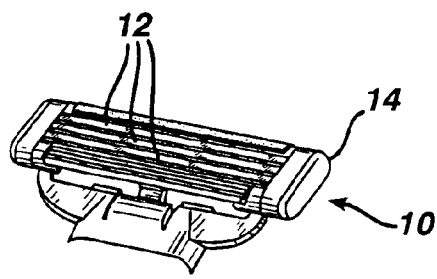
FIG. 1 is a perspective view of a shaving razor cartridge.
Figure 2:
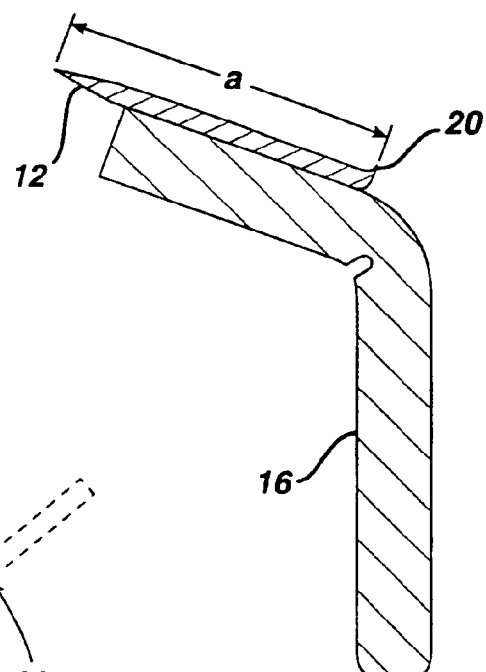
FIG. 2 is a section showing a prior art razor blade used in the FIG. 1 cartridge.
Figure 3:
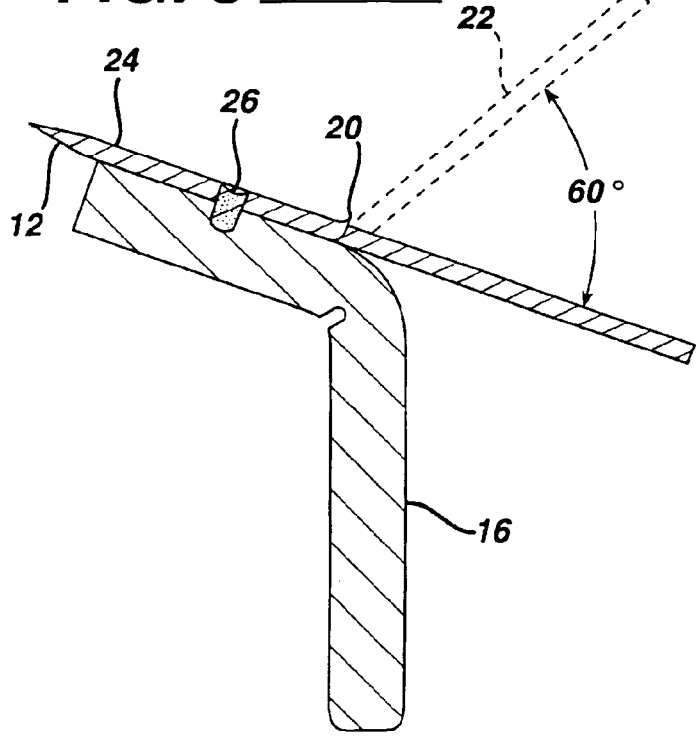
FIG. 3 is a section showing the FIG. 2 blade prior to removal of a rear section used to engage the blade during processing and attaching.
Figure 4:
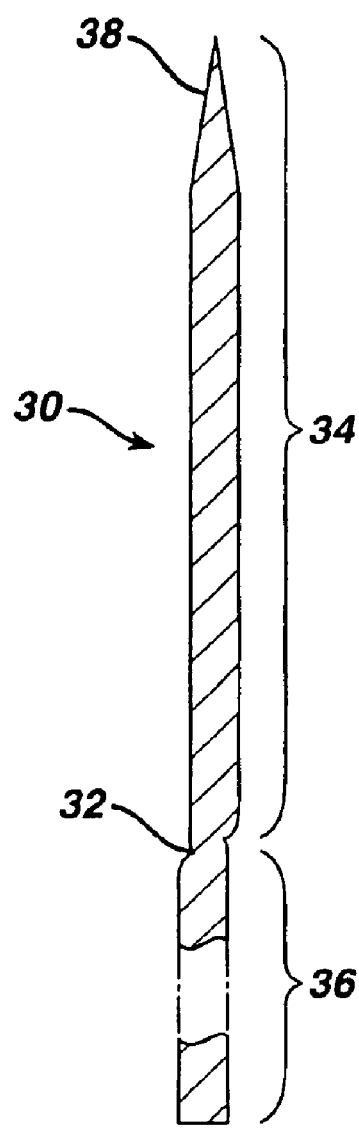
FIG. 4 is a section of a razor blade provided with a weakened section.
Figure 5:
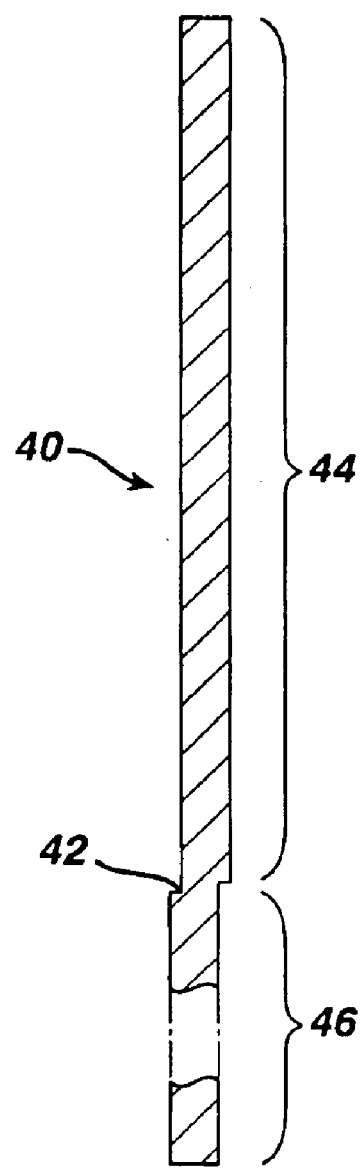
FIG. 5 is a section of a razor blade stock material used to make the FIG. 4 blade prior to sharpening.

Referring to FIG. 4, there is shown razor blade 30 having weakened portion 32 between front section 34 and rear section 36. Front section 34 includes cutting edge 38. Referring to FIG. 5, there is shown strip material 40 having weakened portion 42 between front section 44 and rear section 46. Weakened portions 32 and 42 are offset portions that are formed in strip material 40 during processing by passing the material between rollers with offset portions. The weakened portions 32, 42 are located between ¼ and ¾ of the distance from the front edge to the back of the blade. Weakened portions 42 in the strip material (FIG. 5) have generally right angle edge portions, which become more rounded when the material is flattened during perforation, resulting in the rounded edge portions in weakened portions 32 in blades 30° (FIG. 4).

Figure 6:
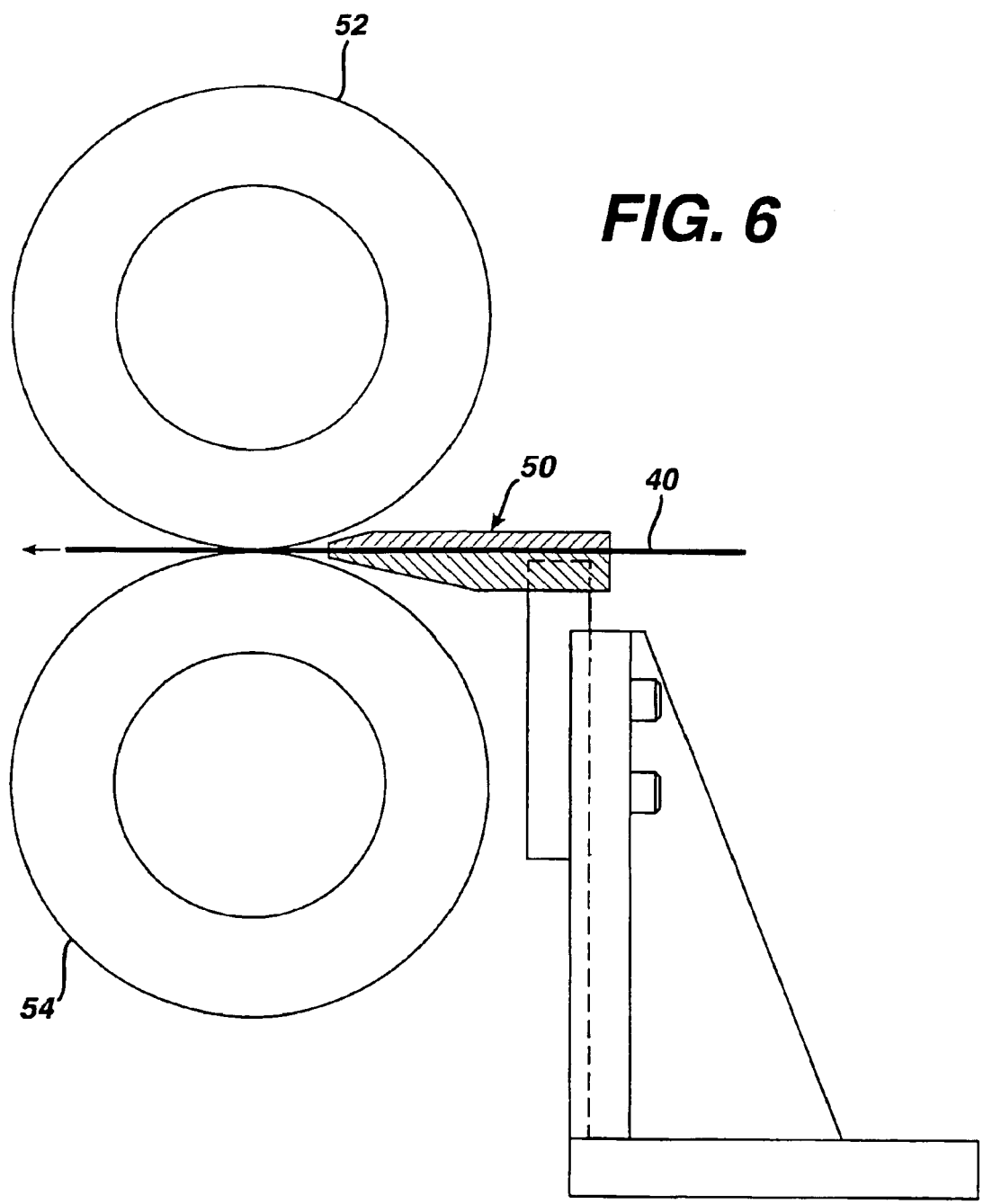
FIG. 6 is side view of rollers used to provide a weakened portion in the FIG. 5 strip material.

Referring to FIGS. 6–8, strip material 40 (without a weakened portion 42) is fed through strip guide 50 prior to passing between rollers 52, 54. Each roller has guide rings 56 (FIG. 7) on the two sides. As is shown in FIG. 8, upper roller 52 as large diameter portion 60 spaced from small diameter portion 62 by neck region 64. Lower roller 54 similarly has large diameter portion 66 and small diameter portion 68 spaced by neck region 70. Each large diameter portion 60, 66 has a diameter that is 0.001 in. greater than the respective small diameter portion 62, 68. Large diameter portion 60 is generally aligned with small diameter portion 68 except that large diameter portion 60 extends beyond the edge of small diameter portion 68 in the offset region. Small diameter portion 62 is generally aligned with large diameter portion 66 except that large diameter portion 66 extends slightly into the offset region. The stock material is 0.003 in. thick, and the spacing between mating portions of rollers 52 and 54 is 0.003 in.

Figure 9:
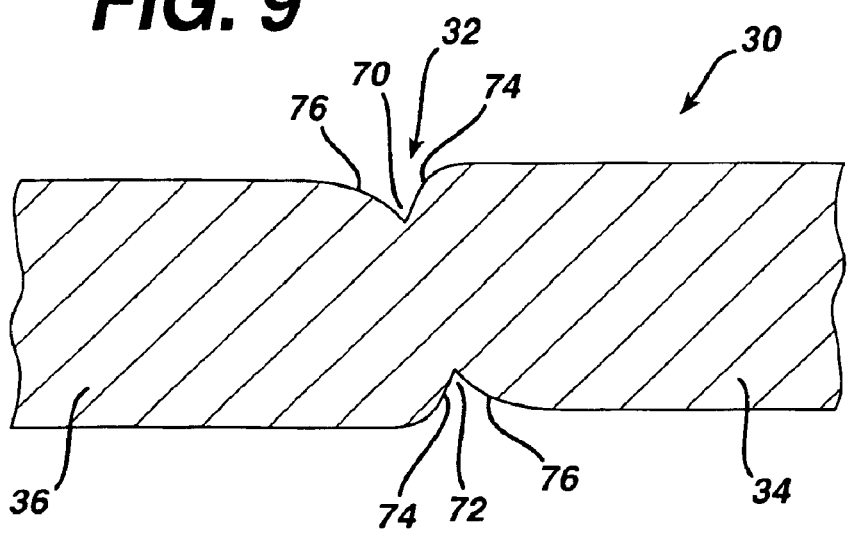
FIG. 9 is a partial sectional view showing the weakened portion of the FIG. 4 blade in detail.

Referring to FIG. 9, it is seen that weakened portion 32 of blade 30 has notch portion 70 on one side and notch portion 72 on the other. The notch portions 70, 72 are offset from each other, and each has a steep surface 74 and a gradually deflecting surface 76.

Figure 10:
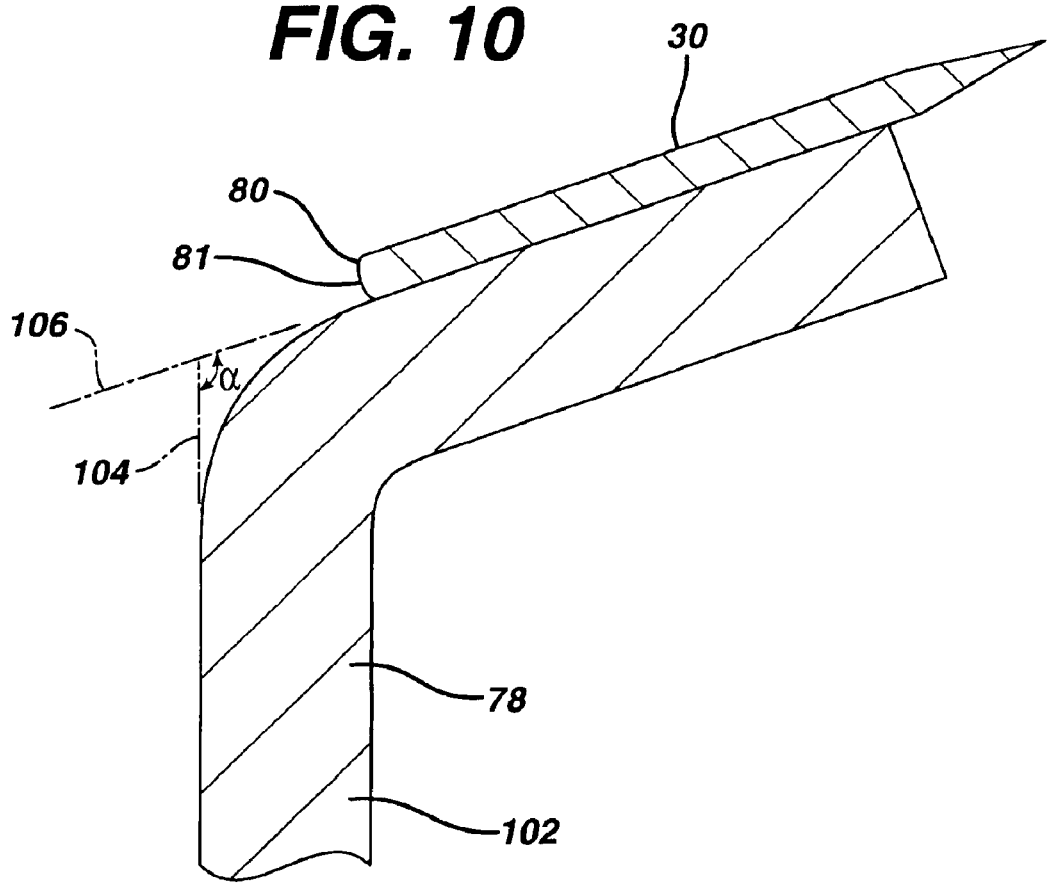
FIG. 10 is a section of the FIG. 4 razor blade after mounting on a support and removal of a rear section.

Referring to FIG. 10, blade 30 is shown mounted on blade support 78 after the rear section 36 has been removed. The rear section 36 is removed by bending section 36 about 10 degrees with respect to the front section 34. The rear edge 80 of blade 30 advantageously has a radius instead of an upturned portion.

In addition to providing reduced upturn, the use of a weakened portion permits one to use harder blade materials that otherwise could not be separated by bending.

Other embodiments of the invention are within the scope of the following claims. For example, in addition to the offset notch crease, other creasing methods could be used to provide the weakened region. Other techniques could also be used to provide the weakened region. E.g., the material could be perforated, cut by laser beam or removed by grinding along the length of the strip material to provide the weakened region. Grooving and scoring could also be carried out by a hard point tool such as carbide, ceramic or diamond.

What is claimed is:

1. A method of making a shaving cartridge comprising a housing, a blade support member attached to the housing, and a blade attached to the bade support member, comprising the steps of (a) providing an elongated, flat strip of metal having a front edge and a back edge extending along its length, (b) sharpening said front edge to result in a cutting edge portion extending along said front edge, (c) weakening a portion of said strip along its length between said front edge and said back edge to result in a weakened portion extending along said strip, a blade portion between said cutting edge portion and said weakened portion, and a removable portion between said weakened portion and said back edge, (d) cutting said strip to result in discreet blade sections, each blade section comprising part of the weakened portion, the blade portion, and the removable portion, (e) attaching a blade section to the blade support member, and (f) separating the removable portion from the blade section attached to the blade support member.

2. The method of claim 1 wherein said weakening includes forming a crease to provide said weakened portion.

3. The method of claim 1 wherein said weakening includes deforming a portion of said strip to reduce its thickness to provide said weakened portion.

4. The method of claim 3 wherein said deforming includes passing said elongated flat strip between two rollers.

5. The method of claim 3 wherein said deforming includes passing said elongated flat strip between two rollers having different profiles and spaced sufficiently close to each other to cause said portion of said strip to be deformed when passing between them.

6. The method of claim 1 wherein said weakening includes forming a notch on a side of said strip to provide said weakened portion.

7. The method of claim 1 wherein said weakening includes forming a first notch on one side of said strip and a second notch on the other side of said strip to provide said weakened portion.

8. The method of claim 1 wherein said separating step is done by bending at said weakened portions.

9. The method of claim 1, the shaving cartridge also including a second support member attached to the housing, wherein steps (e) and (f) are repeated to attach a second blade section to the second support member and to separate the removable portion from the second blade section.

10. A method of making razor blades comprising the step of providing an elongated, flat strip of metal having a front edge and a back edge extending along its length, sharpening said front edge to result in a cutting edge portion extending along said front edge, and weakening a portion of said strip along its length between said front edge and said back edge to result in a weakened portion extending along said strip, a blade portion between said cutting edge portion and said weakened portion, and a removable portion between said weakened portion and said back edge, wherein said weakening step includes deforming a portion of said strip to reduce its thickness to provide said weakened portion, wherein said deforming step includes passing said elongated flat strip between two rollers having different profiles and spaced sufficiently close to each other to cause said portion of said strip to be deformed when passing between them.

* * * * *

UNITED STATES PATENT AND TRADEMARK OFFICE
CERTIFICATE OF CORRECTION

| | | |
|---|---|---|
| PATENT NO. | : 6,957,598 B2 | Page 1 of 1 |
| APPLICATION NO. | : 10/680553 | |
| DATED | : October 25, 2005 | |
| INVENTOR(S) | : Nicolae Neamtu and Stephen F. Hobbs | |

It is certified that error appears in the above-identified patent and that said Letters Patent is hereby corrected as shown below:

In claim 1, col. 4, line 43, replace "bade" with --blade--.

In claim 10, col. 6, line 1, replace "step" with --steps--.

Signed and Sealed this

Twenty-fifth Day of July, 2006

JON W. DUDAS
*Director of the United States Patent and Trademark Office*